US011925215B2

(12) United States Patent
Jung et al.

(10) Patent No.: US 11,925,215 B2
(45) Date of Patent: Mar. 12, 2024

(54) AEROSOL GENERATING DEVICE AND METHOD OF CONTROLLING THE SAME

(71) Applicant: KT&G CORPORATION, Daejeon (KR)

(72) Inventors: Hyung Jin Jung, Seoul (KR); Jin Soo Seong, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/979,912

(22) Filed: Nov. 3, 2022

(65) Prior Publication Data

US 2023/0052593 A1 Feb. 16, 2023

Related U.S. Application Data

(63) Continuation of application No. 16/959,202, filed as application No. PCT/KR2019/013918 on Oct. 23, 2019, now Pat. No. 11,666,102.

(30) Foreign Application Priority Data

Nov. 12, 2018 (KR) ........................ 10-2018-0138303

(51) Int. Cl.

| | |
|---|---|
| ***A24F 13/00*** | (2006.01) |
| ***A24F 40/10*** | (2020.01) |
| ***A24F 40/51*** | (2020.01) |
| ***A24F 40/53*** | (2020.01) |
| ***A24F 40/57*** | (2020.01) |
| ***H05B 1/02*** | (2006.01) |

(52) U.S. Cl.

CPC .............. *A24F 40/57* (2020.01); *A24F 40/10* (2020.01); *A24F 40/51* (2020.01); *A24F 40/53* (2020.01); *H05B 1/02* (2013.01); *H05B 1/0297* (2013.01)

(58) Field of Classification Search

CPC ....................................................... A24F 47/00
USPC ................................................. 131/328–329
See application file for complete search history.

(56) References Cited

U.S. PATENT DOCUMENTS 5,666,978 A 9/1997 Counts et al.
9,532,600 B2 1/2017 Thorens et al.
(Continued)

FOREIGN PATENT DOCUMENTS

CN 101982204 A 3/2011
CN 102012148 A 4/2011
(Continued)

OTHER PUBLICATIONS

Office Action dated Nov. 14, 2022 in Chinese Application No. 201980013829.6.
(Continued)

*Primary Examiner* — Phuong K Dinh
(74) *Attorney, Agent, or Firm* — Sughrue Mion, PLLC

(57) ABSTRACT

An aerosol generating device includes a first heater for heating a liquid composition accommodated in a liquid storage of a vaporizer, a puff sensor detecting a pressure change within the aerosol generating device, and a controller. The aerosol generating device may determine a puff pattern including a plurality of sections, based on a signal received from the puff sensor. In addition, the aerosol generating device may control an operation of the first heater, based on states of the plurality of sections.

19 Claims, 13 Drawing Sheets

(56) References Cited

U.S. PATENT DOCUMENTS

| | | | | |
|---|---|---|---|---|
| 9,987,757 | B2 | 6/2018 | Holecek et al. | |
| 10,143,232 | B2 | 12/2018 | Talon | |
| 10,159,279 | B2 | 12/2018 | Lord et al. | |
| 10,368,583 | B2 | 8/2019 | Takeuchi et al. | |
| 10,398,175 | B2 | 9/2019 | Thorens | |
| 10,499,691 | B2 | 12/2019 | Takeuchi et al. | |
| 10,546,551 | B2 | 1/2020 | Park et al. | |
| 10,561,807 | B2 | 2/2020 | Yamada et al. | |
| 11,666,102 | B2 * | 6/2023 | Jung | A24F 40/50 131/328 |
| 2005/0268913 | A1 | 12/2005 | Morris et al. | |
| 2013/0340750 | A1 | 12/2013 | Thorens et al. | |
| 2016/0374397 | A1 | 12/2016 | Jordan et al. | |
| 2018/0042306 | A1 | 2/2018 | Atkins et al. | |
| 2018/0140008 | A1 | 5/2018 | Sur et al. | |
| 2018/0146710 | A1 | 5/2018 | Bessant et al. | |
| 2018/0184722 | A1 | 7/2018 | Murison et al. | |
| 2019/0297951 | A1 | 10/2019 | Kuczaj | |
| 2020/0086068 | A1 | 3/2020 | Lee et al. | |
| 2020/0352244 | A1 | 11/2020 | Lim et al. | |
| 2021/0106051 | A1 | 4/2021 | Han et al. | |

FOREIGN PATENT DOCUMENTS

| | | | |
|---|---|---|---|
| CN | 104114878 | A | 10/2014 |
| CN | 107530511 | A | 1/2018 |
| CN | 107924232 | A | 4/2018 |
| EP | 2 471 392 | B1 | 9/2013 |
| JP | 2013545474 | A | 12/2013 |
| KR | 10-2010-0127817 | A | 12/2010 |
| KR | 10-2015-0102924 | A | 9/2015 |
| KR | 10-1614171 | B1 | 4/2016 |
| KR | 1020170013401 | A | 2/2017 |
| KR | 1020170095212 | A | 8/2017 |
| KR | 10-2018-0044978 | A | 5/2018 |
| KR | 10-2018-0070443 | A | 6/2018 |
| KR | 101863934 | B1 | 6/2018 |
| KR | 1020180111460 | A | 10/2018 |
| WO | 2009/118085 | A1 | 10/2009 |
| WO | 2015/167000 | A1 | 11/2015 |
| WO | 2018/027189 | A2 | 2/2018 |
| WO | 2018138749 | A1 | 8/2018 |

OTHER PUBLICATIONS

Communication dated Jul. 13, 2021, from the Japanese Patent office in application No. 2020-533137.

Communication dated Jun. 16, 2020, from the Korean Intellectual Property Office in application No. 10-2018-0138303.

Extended European Search Report dated Feb. 18, 2022 from the European Patent Office in EP Application No. 19883579.5.

International search report for PCT/KR2019/013918 dated Feb. 5, 2020.

Office Action dated Jul. 26, 2022 in Japanese Application No. 2020-533137.

Office Action issued in parent U.S. Appl. No. 16/959,202 dated Jul. 8, 2022.

* cited by examiner

AEROSOL GENERATING DEVICE AND METHOD OF CONTROLLING THE SAME

CROSS-REFERENCE TO RELATED APPLICATIONS

This application is a continuation of U.S. application Ser. No. 16/959,202 filed on Jun. 30, 2020, which is a National Stage of International Application No. PCT/KR2019/013918 filed on Oct. 23, 2019, which claims priority from Korean Patent Application No. 10-2018-0138303 filed on Nov. 12, 2018, the disclosure of which is incorporated herein in its entirety by reference.

TECHNICAL FIELD

One or more embodiments of the present disclosure provide an aerosol generating device and a method of controlling the same.

BACKGROUND ART

Recently, there has been an increasing demand for an alternative method of overcoming the shortcomings of common cigarettes. For example, there is growing demand for a method of generating an aerosol by heating an aerosol generating material in a cigarette, rather than by combusting the cigarette.

An aerosol generating device that generates aerosol by heating an aerosol generating material in a cigarette may recognize a user's puff by using a puff sensor. A reference value may be set on the puff sensor to detect the start and end of the puff, but an actual reference pressure changes due to factors in the external environment (a change in temperature due to liquid heating, variations in materials in a cigarette, a change in a suction resistance of an instrument, and the like). As a result, the puff may be over-recognized or unrecognized.

Therefore, a technology for recognizing the puff based on a puff pattern is required.

DESCRIPTION OF EMBODIMENTS

Technical Problem

One or more embodiments of the present disclosure provide an aerosol generating device and a method of controlling the same. One or more embodiments of the present disclosure provide an aerosol generating device that is able to deal with over-recognition or un-recognition of a puff by recognizing the puff based on a puff pattern.

Embodiments of the present disclosure are not limited thereto. It is to be appreciated that other embodiments will be apparent to those skilled in the art from a consideration of the specification or practice of the present disclosure described herein.

Solution to Problem

An aerosol generating device may include: a first heater for heating a liquid composition accommodated in a liquid storage of a vaporizer; a puff sensor for detecting a pressure change within the aerosol generating device; and a controller.

According to embodiments of the present disclosure, the aerosol generating device may determine a puff pattern including a plurality of sections based on a signal received from the puff sensor. In addition, the aerosol generating device may control an operation of the first heater based on states of the plurality of sections.

Advantageous Effects of Disclosure

According to one or more embodiments of the present disclosure, a user's puff may be recognized accurately by recognizing the puff based on the puff pattern. In addition, according to one or more embodiments of the present disclosure, a puff detection error situation may be determined based on the puff pattern, and accordingly, the aerosol generating device may be controlled. Moreover, according to one or more embodiments of the present disclosure, a heater may be controlled based on a slope cumulative value derived from the puff pattern.

BEST MODE

According to an aspect of the present disclosure, an aerosol generating device includes: a first heater for heating a liquid composition accommodated in a liquid storage of a vaporizer; a puff sensor detecting a pressure change within the aerosol generating device; and a controller configured to determine states of a plurality of sections constituting a puff pattern representing a pressure change over time based on a signal received from the puff sensor and control an operation of the first heater based on the states of the plurality of sections.

According to another aspect of the present disclosure, a method of controlling an aerosol generating device includes determining states of a plurality of sections constituting a puff pattern representing a pressure change over time based on a signal received from a puff sensor and controlling an operation of a first heater based on the states of the plurality of sections.

According to another aspect of the present disclosure, a computer readable recording medium has recorded thereon a computer program for executing the method of controlling the aerosol generating device according to another aspect of the present disclosure.

Mode of Disclosure

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
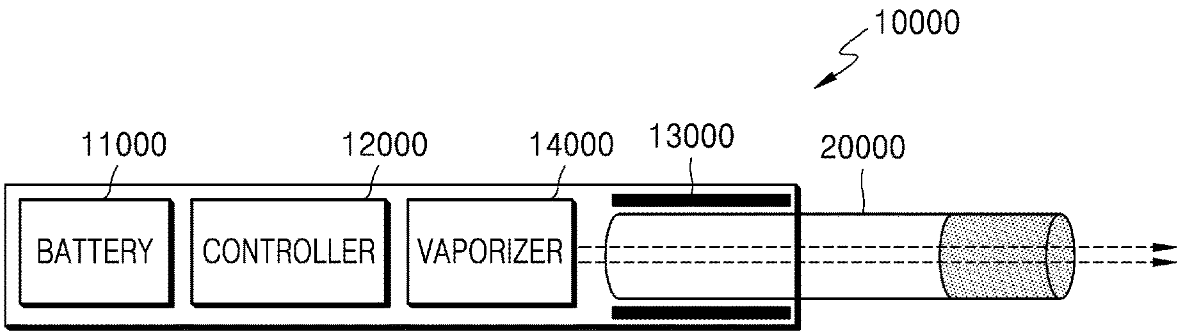
FIGS. 1 and 2 are diagrams showing examples in which a cigarette is inserted into an aerosol generating device.
Figure 2:
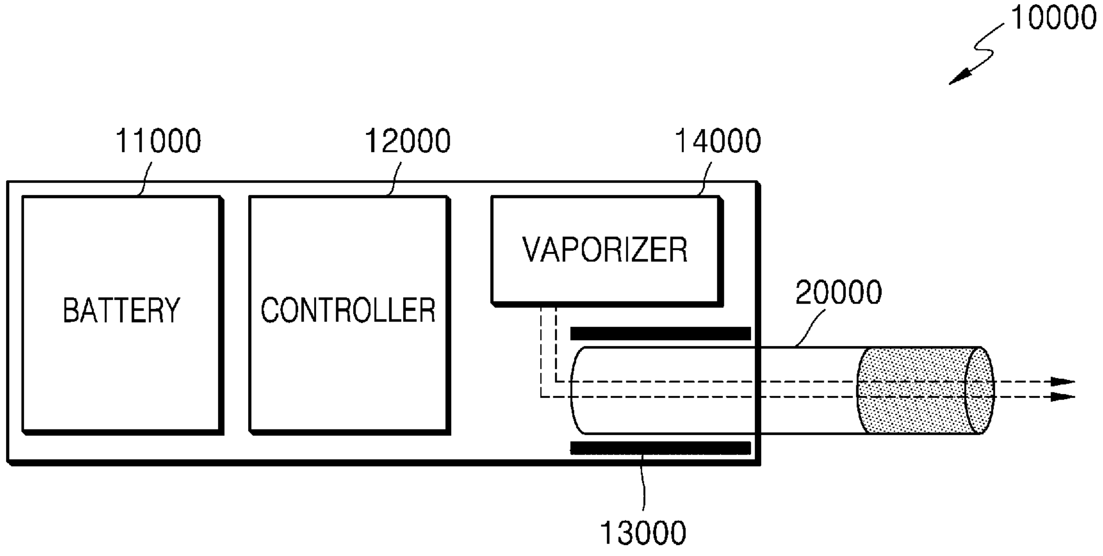

FIGS. 1 and 2 are diagrams showing examples in which a cigarette is inserted into an aerosol generating device.

Referring to FIGS. 1 and 2, an aerosol generating device 100 includes a battery 11000, a controller 12000, a second heater 13000, and a vaporizer 14000 comprising a first heater. Also, a cigarette 20000 may be inserted into an inner space of the aerosol generating device 10000.

FIGS. 1 and 2 only illustrate components of the aerosol generating device 10000 which are related to the present embodiment. However, it will be understood by one of ordinary skill in the art related to the present embodiment that other general-purpose components may be further included in the aerosol generating device 10000, in addition to the components illustrated in FIGS. 1 and 2.

Also, FIGS. 1 and 2 illustrate that the aerosol generating device 10000 includes the second heater 13000. However, as necessary, the second heater 13000 may be omitted.

FIG. 1 illustrates that the battery 11000, the controller 12000, the vaporizer 14000, and the second heater 13000 are arranged in series. Also, FIG. 2 illustrates that the vaporizer 14000 and the second heater 13000 are arranged in parallel. However, the internal structure of the aerosol generating device 10000 is not limited to the structures illustrated in FIGS. 1 and 2. In other words, according to the design of the aerosol generating device 10000, the battery 11000, the controller 12000, the vaporizer 14000, and the second heater 13000 may be differently arranged.

When the cigarette 20000 is inserted into the aerosol generating device 10000, the aerosol generating device 10000 may operate the vaporizer 14000 to generate aerosol from the vaporizer 14000. The aerosol generated by the vaporizer 14000 is delivered to the user by passing through the cigarette 20000. The vaporizer 14000 will be described in more detail later.

The battery 11000 supplies electric power to be used for the aerosol generating device 10000 to operate. For example, the battery 11000 may supply power to heat the second heater 13000 or the vaporizer 14000 and may supply power for operating the controller 12000. Also, the battery 11000 may supply power for operations of a display, a sensor, a motor, etc. mounted in the aerosol generating device 10000.

The controller 12000 may control overall operations of the aerosol generating device 10000. In detail, the controller 12000 may control not only operations of the battery 11000, the second heater 13000, and the vaporizer 14000, but also operations of other components included in the aerosol generating device 10000. Also, the controller 12000 may check a state of each of the components of the aerosol generating device 10000 to determine whether or not the aerosol generating device 10000 is able to operate.

The controller 12000 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The second heater 13000 may be heated by the power supplied from the battery 11000. For example, when the cigarette 20000 is inserted into the aerosol generating device 10000, the second heater 13000 may be located outside the cigarette 20000. Thus, the heated second heater 13000 may increase a temperature of an aerosol generating material in the cigarette 20000.

The second heater 13000 may include an electro-resistive heater. For example, the second heater 13000 may include an electrically conductive track, and the second heater 13000 may be heated when currents flow through the electrically conductive track. However, the second heater 13000 is not limited to the example described above and may include any other heaters which may be heated to a desired temperature. Here, the desired temperature may be pre-set in the aerosol generating device 10000 or may be manually set by a user.

As another example, the second heater 13000 may include an induction heater. In detail, the second heater 13000 may include an electrically conductive coil for heating a cigarette by an induction heating method, and the cigarette may include a susceptor which may be heated by the induction heater.

FIGS. 1 and 2 illustrate that the second heater 13000 is positioned outside the cigarette 20000, but the position of the cigarette 20000 is not limited thereto. For example, the second heater 13000 may include a tube-type heating element, a plate-type heating element, a needle-type heating element, or a rod-type heating element, and may heat the inside or the outside of the cigarette 20000, according to the shape of the heating element.

Also, the aerosol generating device 10000 may include a plurality of heaters 13000. Here, the plurality of heaters 13000 may be inserted into the cigarette 20000 or may be arranged outside the cigarette 20000. Also, some of the plurality of heaters 13000 may be inserted into the cigarette 20000, and the others may be arranged outside the cigarette 20000. In addition, the shape of the second heater 13000 is not limited to the shapes illustrated in FIGS. 1 and 2 and may include various shapes.

The vaporizer 14000 may generate aerosol by heating a liquid composition and the generated aerosol may pass through the cigarette 20000 to be delivered to a user. In other words, the aerosol generated via the vaporizer 14000 may move along an air flow passage of the aerosol generating device 10000 and the air flow passage may be configured such that the aerosol generated via the vaporizer 14000 passes through the cigarette 20000 to be delivered to the user.

For example, the vaporizer 14000 may include a liquid storage, a liquid delivery element, and a first heating element, but it is not limited thereto. For example, the liquid storage, the liquid delivery element, and the heating element may be included in the aerosol generating device 10000 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14000 or may be formed integrally with the vaporizer 14000.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The first heater is an element for heating the liquid composition delivered by the liquid delivery element. For example, the first heater may be a metal heating wire, a metal hot plate, a ceramic heater, or the like, but is not limited thereto. In addition, the first heater may include a conductive filament such as nichrome wire and may be positioned as being wound around the liquid delivery element. The first heater may be heated by a current supply and may transfer heat to the liquid composition in contact with the first heater, thereby heating the liquid composition. As a result, aerosol may be generated.

For example, the vaporizer 14000 may be referred to as a cartomizer or an atomizer, but it is not limited thereto.

The aerosol generating device 10000 may further include general-purpose components in addition to the battery 11000, the controller 12000, and the second heater 13000. For example, the aerosol generating device 10000 may include a display capable of outputting visual information and/or a motor for outputting haptic information. Also, the aerosol generating device 10000 may include at least one sensor (a puff detecting sensor, a temperature detecting sensor, a cigarette insertion detecting sensor, etc.). Also, the aerosol generating device 10000 may be formed as a structure where, even when the cigarette 20000 is inserted into the aerosol generating device 10000, external air may be introduced or internal air may be discharged.

Although not illustrated in FIGS. 1 and 2, the aerosol generating device 10000 and an additional cradle may form together a system. For example, the cradle may be used to charge the battery 11000 of the aerosol generating device 10000. Also, the second heater 13000 may be heated when the cradle and the aerosol generating device 10000 are coupled to each other.

The cigarette 20000 may be similar to a general combustive cigarette. For example, the cigarette 20000 may be divided into a first portion including an aerosol generating material and a second portion including a filter, etc. Alternatively, the second portion of the cigarette 20000 may also include an aerosol generating material. For example, an aerosol generating material made in the form of granules or capsules may be inserted into the second portion.

The entire first portion may be inserted into the aerosol generating device 10000, and the second portion may be exposed to the outside. Alternatively, only a portion of the first portion may be inserted into the aerosol generating device 10000, or a portion of the first portion and a portion of the second portion may be inserted thereinto. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 10000. For example, opening and closing of the air passage and/or a size of the air passage may be controlled by the user. Accordingly, the amount and smoothness of vapor may be adjusted by the user. As another example, the external air may flow into the cigarette 20000 through at least one hole formed in a surface of the cigarette 20000.

Hereinafter, an example of the cigarette 20000 will be described with reference to FIG. 3.

Figure 3:
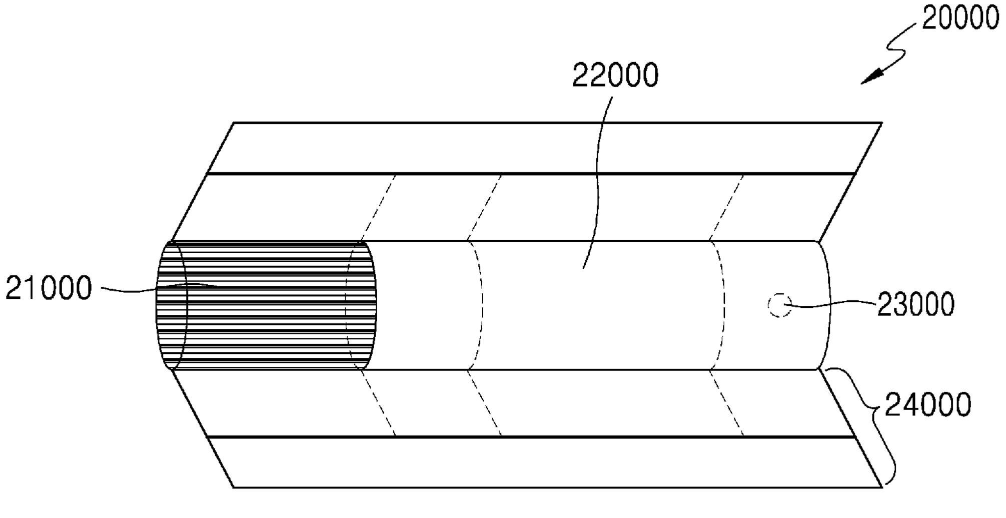
FIG. 3 is a drawing illustrating an example of a cigarette.

FIG. 3 is a drawing illustrating an example of a cigarette.

Referring to FIG. 3, the cigarette 20000 may include a tobacco rod 21000 and a filter rod 22000. The first portion described above with reference to FIGS. 1 and 2 may include the tobacco rod 21000, and the second portion may include the filter rod 22000.

FIG. 3 illustrates that the filter rod 22000 includes a single segment. However, the filter rod 22000 is not limited thereto. In other words, the filter rod 22000 may include a plurality of segments. For example, the filter rod 22000 may include a first segment configured to cool aerosol and a second segment configured to filter a certain component included in the aerosol. Also, as necessary, the filter rod 22000 may further include at least one segment configured to perform other functions.

The cigarette 2000 may be packaged using at least one wrapper 24000. The wrapper 24000 may have at least one hole through which external air may be introduced or internal air may be discharged. For example, the cigarette 20000 may be packaged using one wrapper 24000. As another example, the cigarette 20000 may be doubly packaged using at least two wrappers 24000. For example, the tobacco rod 21000 may be packaged using a first wrapper, and the filter rod 22000 may be packaged using a second wrapper. Also, the tobacco rod 21000 and the filter rod 22000, which are respectively packaged using separate wrappers, may be coupled to each other, and the entire cigarette 20000 may be packaged using a third wrapper.

When each of the tobacco rod 21000 and the filter rod 22000 includes a plurality of segments, each segment may be packaged using a separate wrapper. Also, the entire cigarette 20000 including the plurality of segments, which are respectively packaged using the separate wrappers and which are coupled to each other, may be re-packaged using another wrapper.

The tobacco rod 21000 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21000 may include other additives, such as flavors, a wetting agent, and/or organic acid. Also, the tobacco rod 21000 may include a flavored liquid, such as menthol or a moisturizer, which is injected to the tobacco rod 21000.

The tobacco rod 21000 may be manufactured in various forms. For example, the tobacco rod 21000 may be formed as a sheet or a strand. Also, the tobacco rod 21000 may be formed as a pipe tobacco, which is formed of tiny bits cut from a tobacco sheet. Also, the tobacco rod 21000 may be surrounded by a heat conductive material. For example, the heat-conducting material may be, but is not limited to, a metal foil such as aluminum foil. For example, the heat conductive material surrounding the tobacco rod 21000 may uniformly distribute heat transmitted to the tobacco rod 21000, and thus, the heat conductivity of the tobacco rod may be increased. As a result, the taste of the tobacco may be improved. Also, the heat conductive material surrounding the tobacco rod 21000 may function as a susceptor heated by the induction heater. Here, although not illustrated in the drawings, the tobacco rod 21000 may further include an additional susceptor, in addition to the heat conductive material surrounding the tobacco rod 21000.

The filter rod 22000 may include a cellulose acetate filter. Shapes of the filter rod 22000 are not limited. For example, the filter rod 22000 may include a cylinder-type rod or a tube-type rod having a hollow inside. Also, the filter rod 22000 may include a recess-type rod. When the filter rod 22000 includes a plurality of segments, at least one of the plurality of segments may have a different shape.

The filter rod 22000 may be formed to generate flavors. For example, a flavoring liquid may be injected onto the filter rod 22000, or an additional fiber coated with a flavoring liquid may be inserted into the filter rod 22000.

Also, the filter rod 22000 may include at least one capsule 23000. Here, the capsule 23000 may generate a flavor or an aerosol. For example, the capsule 23000 may have a configuration in which a liquid containing a flavoring material is wrapped with a film. For example, the capsule 23000 may have a spherical or cylindrical shape, but is not limited thereto.

When the filter rod 22000 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Although not illustrated in FIG. 3, the cigarette 20000 according to an embodiment may further include a front-end filter. The front-end filter may be located on a side of the tobacco rod 21000, the side not facing the filter rod 22000. The front-end filter may prevent the tobacco rod 21000 from being detached outwards and prevent the liquefied aerosol from flowing into the aerosol generating device 10000 (FIGS. 1 and 2) from the tobacco rod 21000, during smoking.

Figure 4:
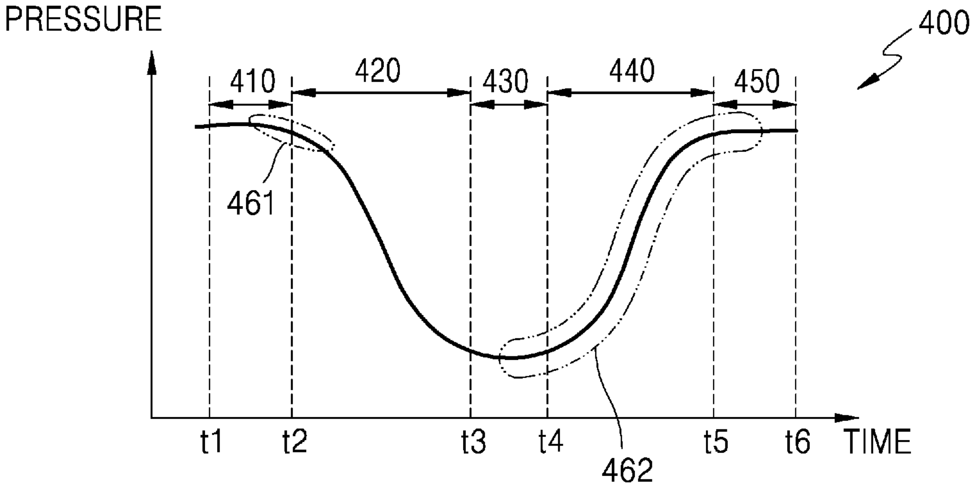
FIG. 4 is a diagram illustrating an example of a puff pattern according to an embodiment of the present disclosure.

FIG. 4 is a diagram illustrating an example of a puff pattern according to an embodiment of the present disclosure.

An aerosol generating device may include a puff sensor detecting a pressure change within the aerosol generating device. The puff sensor detects inhalation pressure, which is air pressure generated by a user biting and inhaling (puffing) a mouthpiece of the aerosol generating device or a cigarette inserted into the aerosol generating device, and generates a signal.

A detection signal from the puff sensor is transmitted to a controller. The controller may determine a puff pattern based on the signal received from the puff sensor. The puff pattern may be represented as a pressure change over time. For example, the puff pattern may be represented as a pressure change (hPa) over time (ms).

Referring to FIG. 4, a puff pattern 400 may include at least one of a pressure maintaining state 410, 430, and 450, a pressure falling state 420, and a pressure rising state 440.

The pressure maintaining state 410, 430, and 450 may include a state in which puffing may not be performed and in general, pressure within the aerosol generating device in the pressure maintaining state 410, 430, and 450 may be maintained within a preset range.

The pressure falling state 420 may occur at the start of puffing. The pressure falling state 420 may include a state in which air within the aerosol generating device flows outward as puffing is performed. In the pressure falling state 420, as air within the aerosol generating device flows outward, pressure within the aerosol generating device may decrease.

The pressure rising state 440 may occur when puffing ends. The pressure rising state 440 may include a state in which, as puffing ends, air flows into the aerosol generating device from outside. In the pressure rising state 440, as air flows into the aerosol generating device from outside, pressure within the aerosol generating device may increase.

In an embodiment, the controller may control an operation of at least one of a first heater and a second heater based on a change in a state constituting the puff pattern 400. The aerosol generating device may include at least one of the first heater and the second heater.

The second heater may heat the cigarette inserted into the aerosol generating device. For example, the second heater may include a film heater for heating an exterior of the cigarette. The aerosol generating device may include a vaporizer including a liquid storage, a liquid delivery element, and the first heater for heating a liquid. The first heater may heat the liquid delivery element to generate aerosol.

Based on the signal received from the puff sensor, if the state has changed from the pressure maintaining state 410 to the pressure falling state 420, the controller may start an operation of at least one of the first heater and the second heater. Hereinafter, the case where the state has changed from the pressure maintaining state 410 to the pressure falling state 420 will be referred to as a first situation 461.

Following the start of the operation of at least one of the first heater and the second heater, based on the signal received from the puff sensor, if the state has changed in the order of the pressure maintaining state 430, the pressure rising state 440, and the pressure maintain state 450, the controller may suspend the operation of at least one of the first heater and the second heater. Hereinafter, the case where the state has changed in the order of the pressure maintaining state 430, the pressure rising state 440, and the pressure maintaining state 450 will be referred to as a second situation 462.

In an embodiment, the number of puffs may be counted based on a change in the state constituting the puff pattern 400. When the puff pattern 400 is configured in the order of the pressure maintaining state 410, the pressure falling state 420, the pressure maintaining state 430, the pressure rising state 440, and the pressure maintaining state 450 (for example, when the first situation 461 and the second situation 462 occur consecutively), the controller may determine that the puff pattern 400 corresponds to normal puffing. When the puff pattern 400 corresponds to normal puffing, the controller may count the number of puffs.

When the number of puff is counted one by one, the controller may automatically control the operation of at least one of the first heater and the second heater based on a counted value. In an embodiment, when the number of puffs reaches a preset number of times, the controller may automatically end the operation of at least one of the first heater and the second heater. For example, when the number of puffs reaches fourteen times, the controller may determine that the puff series is completed to automatically end the operation of the first heater and the second heater.

The first situation 461 and the second situation 462 may occur consecutively under the normal puffing. When the first situation 461 and the second situation 462 occur consecutively, the controller may count the number of puffs. The controller may control the operation of at least one of the first heater and the second heater depending on the occurrence of the first situation 461 and the second situation 462. For example, when the first situation 461 occurs, the controller may start the operation of the first heater and when the second situation 462 occurs, the controller may end the operation of the first heater.

As another example, when the first situation 461 occurs for the first time in a puff series having fourteen times of puffs, the controller may start the operation of both the first heater and the second heater. If the second heater has been preheated before the first situation 461 occurs for the first time, the controller may switch the second heater from a preheating mode to a heating mode.

When the second situation 462 occurs consecutively after the first situation 461 occurs, the controller may end the operation of the first heater alone while maintaining the operation of the second heater.

When the first situation 461 occurs a second time, since the operation of the second heater is maintained, the controller may only start the operation of the first heater. When the second situation 462 occurs a second time, since the operation of the second heater is maintained, the controller may only suspend the operation of the first heater. In that case, the controller may count the number of puffs as ‘two times’.

In the same way, when the first situation 461 and the second situation 462 alternately occur a third time to a thirteenth time, the controller may only control (start or suspend) the operation of the first heater and count the number of puffs. When the first situation 461 and the second situation 462 alternately occur a thirteenth time, the controller may count the number of puff as ‘thirteen times’.

Likewise, when the first situation 461 occurs a fourteenth time, the controller may only start the operation of the first heater. Since the case where the second situation 462 occurs a fourteenth time refers to a situation in which the puff series (fourteen times of puffs) ends, the controller may count the number of puffs as ‘fourteen times’ and suspend the operation of both the first heater and the second heater.

It has been described that the second situation 462 refers to a state change in the order of the pressure maintaining state 430, the pressure rising state 440, and the pressure maintaining state 450. However, the second situation 462 may also refer to a state change in the order of the pressure maintaining state 430 and the pressure rising state 440. When a state change occurs in the order of the pressure maintaining state 430 and the pressure rising state 440 before the pressure maintaining state 450 occurs (or, regardless of the occurrence of the pressure maintaining state 450), the controller may suspend the operation of at least one of the first heater and the second heater.

A duration (t1 to t6) of the puff pattern 400 may be about two seconds. However, the duration (t1 to t6) of the puff pattern 400 may differ depending on a user.

In FIG. 4, the puff pattern 400 includes the pressure maintaining state 410, 430, and 450, the pressure falling state 420, and the pressure rising state 440 only. However, there may be an irregular pressure fluctuation due to the external environment.

Figure 5:
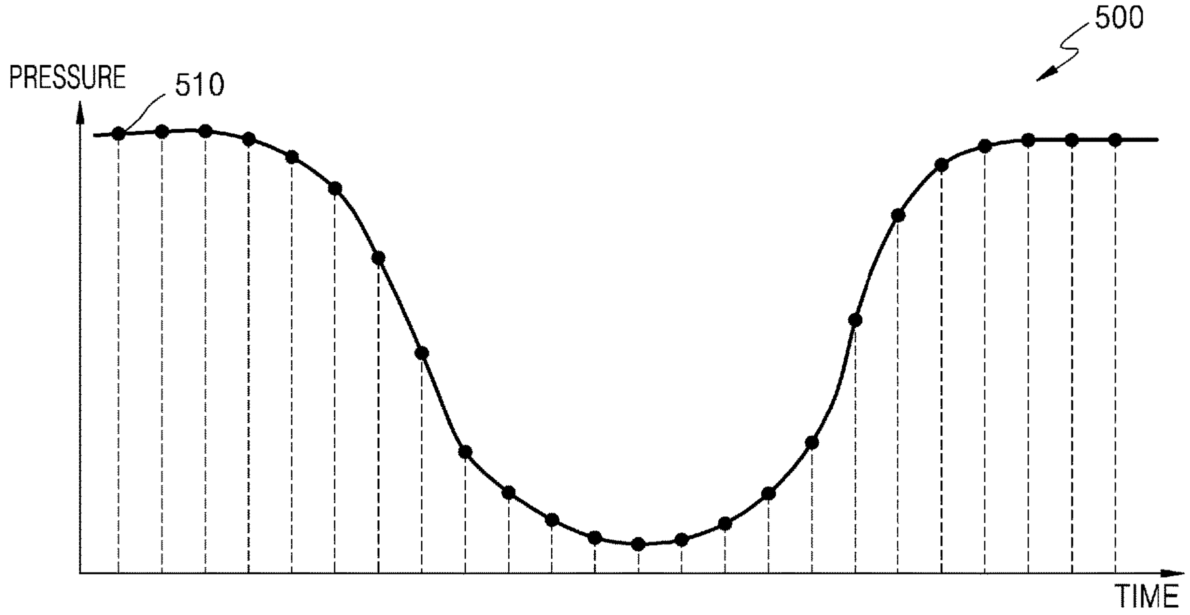
FIG. 5 is a diagram illustrating an example of determining a puff pattern according to an embodiment of the present disclosure.

FIG. 5 is a diagram illustrating an example of determining a puff pattern according to an embodiment of the present disclosure.

An aerosol generating device may include a puff sensor for detecting a pressure change within the aerosol generating device. A detection signal of the puff sensor is transmitted to a controller.

The signal received from the puff sensor may include pressure measured values measured at certain intervals of time. In an embodiment, the puff sensor may measure pressure within the aerosol generating device at a certain cycle. For example, the puff sensor may measure pressure within the aerosol generating device at a cycle of 75 Hz. However, pressure measurement cycle of the puff sensor is not limited thereto.

Referring to FIG. 5, the controller may use at least some of the pressure measured values received from the puff sensor to calculate a pressure sample value 510. In an embodiment, the controller may use a representative value (for example, an average value, a median value, and the like) of some consecutive values of the received pressure measured values to calculate the pressure sample value 510.

For example, the controller may average the pressure measured values of a consecutive number (for example, three) to calculate the pressure sample value 510. When three consecutive pressure measured values are averaged to calculate the pressure sample value 510, a time interval between the pressure sample value 510 may be 40 ms. In other words, the time interval among a plurality of pressure sample values included in a puff pattern 500 may be constant. However, a method of calculating the number of pressure measured values used to obtain the pressure sample value 510 and a method of calculating the pressure sample value 510 are not limited thereto.

The controller may use a plurality of pressure sample values to determine the puff pattern 500. In an embodiment, the controller may use the pressure sample value 510 instead of the pressure measured values received from the puff sensor to determine the puff pattern 500. Since the puff pattern 500 is determined by using the pressure sample value 510 instead of the pressure measured values, a more aligned puff pattern 500 having a reduced irregular fluctuation may be obtained.

Figure 6:
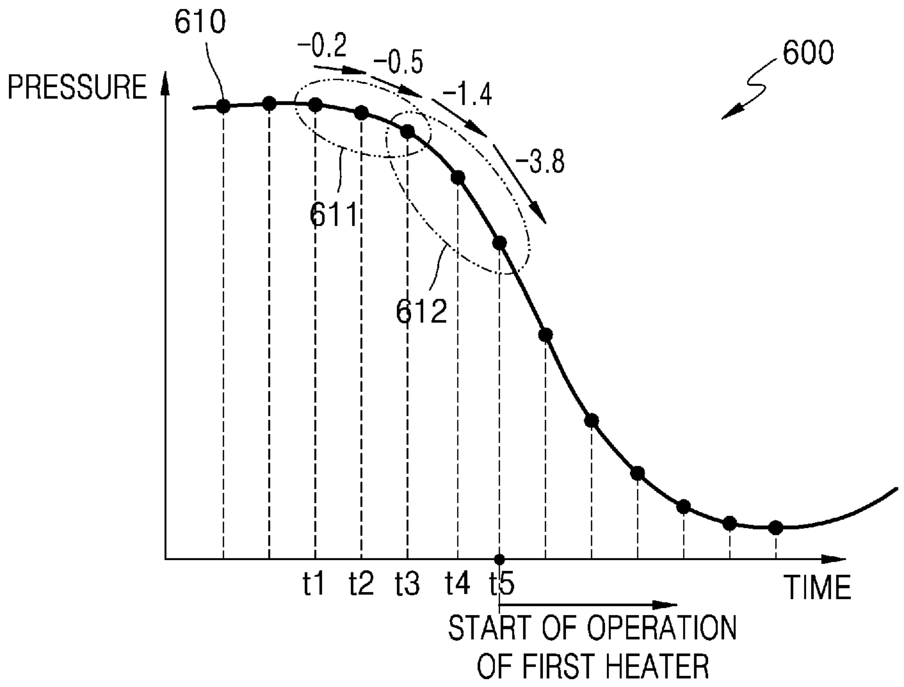
FIG. 6 is a diagram illustrating an example of a starting operation of a heater, based on a slope cumulative value according to an embodiment of the present disclosure.

FIG. 6 is a diagram illustrating an example of a starting operation of a first heater, based on a slope cumulative value according to an embodiment of the present disclosure.

Referring to FIG. 6, a controller may use a plurality of pressure sample values to determine a puff pattern 600. In an embodiment, the controller may use a pressure sample value 610 calculated by averaging consecutive values of some of pressure measured values instead of using the pressure measured values received from a puff sensor to determine the puff pattern 600.

The puff pattern 600 may include a plurality of pressure sample values. Of the plurality of pressure sample values included in the puff pattern 600, a certain number of consecutive pressure sample values may form a section. For example, the section may include three consecutive pressure sample values. The section in the puff pattern 600 may be set differently based on the number of the pressure sample values corresponding to the start of the section and the total number of the pressure sample values included in the section.

The controller may control the operation of a first heater based on the slope cumulative value of each of a plurality of sections. The slope cumulative value may be obtained by accumulating slopes between adjacent pressure sample values in a particular section. Unit of the slope cumulative value may include ‘hpa/ms’. However, embodiments of the present disclosure are not limited thereto.

In an embodiment, the controller may determine a state of a particular section in which the slope cumulative value is maintained within a preset range as a ‘pressure maintaining state’ and the state of a particular section in which the slope cumulative value is less than a preset negative value as a ‘pressure falling state’. For example, the controller may determine the state of a particular section in which the slope cumulative value is maintained at −4 hpa/ms or greater and less than +4 hpa/ms as the ‘pressure maintaining state’ and the state of a particular section in which the slope cumulative value is maintained below −4 hpa/ms as the ‘pressure falling state’.

Referring to FIG. 6, the controller may calculate ‘−0.2 hpa/ms’, which is a slope value between the pressure sample value at t1 and the pressure sample value at t2 to calculate the slope cumulative value for a first section 611. The controller may also calculate ‘−0.5 hpa/ms’, which is the slope value between the pressure sample value at t2 and the pressure sample value at t3. Thus, the slope cumulative value of the first section 611 becomes ‘−0.7 hpa/ms’.

In addition, the controller may calculate ‘−1.4 hpa/ms’, which is the slope value between the pressure sample value at t3 and the pressure sample value at t4 to calculate the slope cumulative value for a second section 612. The controller may also calculate ‘−3.8 hpa/ms’, which is the slope value between the pressure sample value at t4 and the pressure sample value at t5. Thus, the slope cumulative value of the second section 612 becomes ‘−5.2 hpa/ms’.

The controller may determine the first section 611 having ‘−0.7 hpa/ms’ as the slope cumulative value as the ‘pressure maintaining state’, and the second section 612 having ‘−5.2 hpa/ms’ as the slope cumulative value as the ‘pressure falling state’.

However, a value used to control the operation of the first heater is not limited to the slope cumulative value. For example, the controller may calculate slope values from the adjacent pressure sample values constituting each of the plurality of sections and accumulate the differences of the calculated slope values. The controller may control the operation of the first heater based on the cumulative slope differences.

The controller may control the operation of the first heater based on states of the sections adjacent to each other. If the first section 611 is determined as the ‘pressure maintaining state’ and the second section 612 following the first section 611 is determined as the ‘pressure falling state’ based on a signal from the puff sensor, it may indicate a situation in which pressure within an aerosol generating device is reduced as air within the aerosol generating device flows outward as puffing is started. The controller may confirm the start of puffing and start the operation of the first heater.

Referring to FIG. 6, as the first section 611 is determined as the ‘pressure maintaining state’ and the second section 612 is determined as the ‘pressure falling state’, the controller may start the operation of the first heater at t5, which is an end point of the second section 612.

In a puff series having fourteen times of puffs, when the puff pattern 600 of FIG. 6 is detected for the first time, the controller may start the operation of a second heater as well as the first heater.

In another embodiment, the second heater may have started preheating before a puff is recognized for the first time in a particular puff series, that is, before the puff pattern 600 is detected for the first time. As the aerosol generating device is turned on by a user pressing an interface (for example, a button, a touch screen, or the like) on the aerosol generating device, the controller may switch the second heater to a preheating mode. Following that, when the puff pattern 600 is detected for the first time, the controller may switch the second heater from the preheating mode to a heating mode.

In the heating mode, the temperature of the second heater is raised to a target temperature such that an aerosol generating material in a cigarette may be heated to generate aerosol, and in the preheating mode. The temperature of the second heater may be maintained at a temperature lower than the target temperature. However, operational method of the heating mode and the preheating mode is not limited thereto.

Figure 7A:
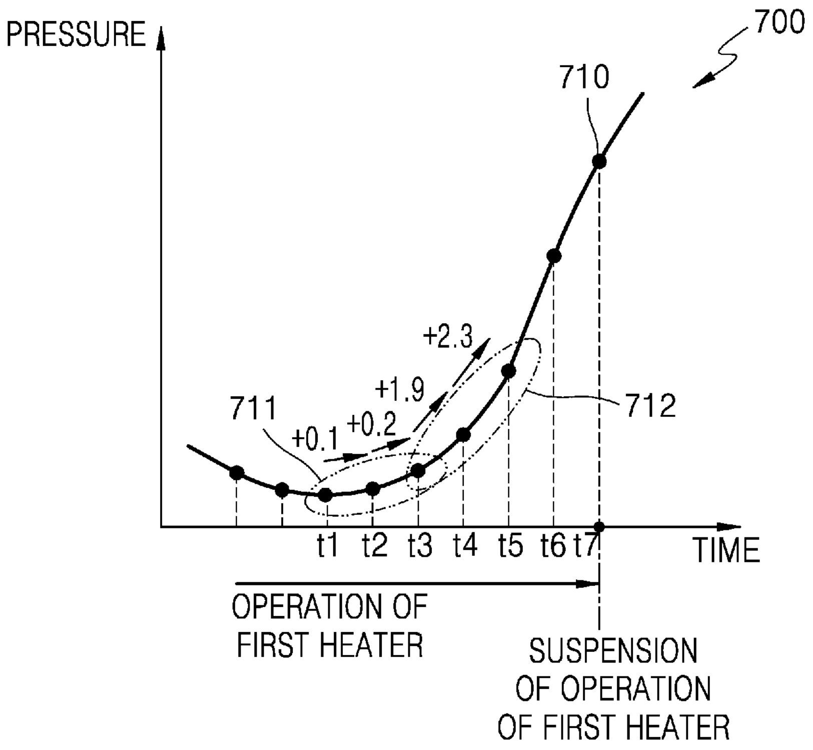
FIGS. 7A to 7B are diagrams illustrating an example of a suspending operation of a heater based on a slope cumulative value according to an embodiment of the present disclosure.
Figure 7B:
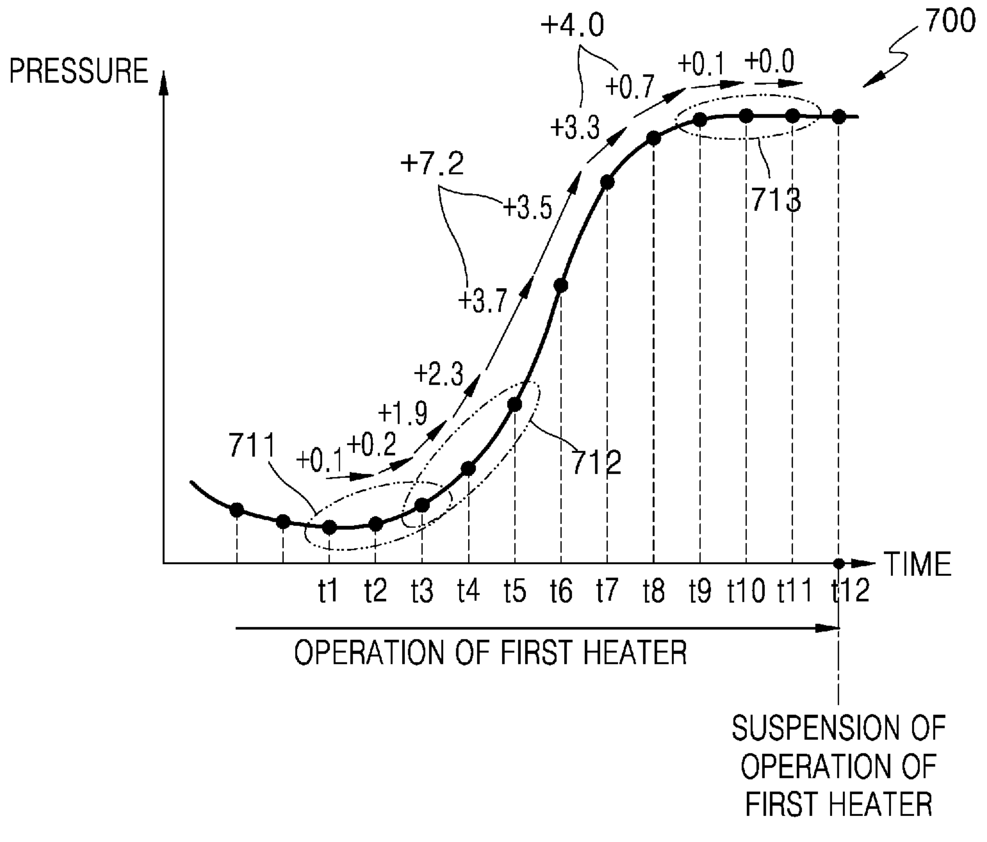

FIGS. 7A to 7B are diagrams illustrating an example of a suspending operation of a first heater based on a slope cumulative value according to an embodiment of the present disclosure.

Referring to FIG. 7A, a controller may use a plurality of pressure sample values to determine a puff pattern 700. In an embodiment, the controller may use a pressure sample value 710 calculated by averaging consecutive values of some of pressure measured values instead of using the entire pressure measured values received from a puff sensor, to determine the puff pattern 700.

Of the plurality of pressure sample values included in the puff pattern 700, a certain number of consecutive pressure sample values may form a section. For example, the section may include three consecutive pressure sample values.

The controller may determine a state for each of a plurality of sections based on a slope cumulative value of each of the plurality of sections. In an embodiment, the controller may determine a state of a particular section in which the slope cumulative value is maintained within a preset range as a ‘pressure maintaining state’, and the state of a particular section in which the slope cumulative value is greater than or equal to a preset positive value as a ‘pressure rising state’. For example, the controller may determine the state of a particular section in which the slope cumulative value is maintained at −4 hpa/ms or greater and less than +4 hpa/ms as the 'pressure maintaining state', and the state of a particular section in which the slope cumulative value is maintained at +4 hpa/ms or greater as the 'pressure rising state'.

Referring to FIG. 7A, the controller may calculate '+0.1 hpa/ms', which is a slope value between the pressure sample value at t1 and the pressure sample value at t2 to calculate the slope cumulative value for a third section 711. The controller may also calculate '+0.2 hpa/ms', which is the slope value between the pressure sample value at t2 and the pressure sample value at t3. Thus, the slope cumulative vale of the third section 711 becomes '+0.3 hpa/ms'.

In addition, the controller may calculate '+1.9 hpa/ms', which is the slope value between the pressure sample value at t3 and the pressure sample value at t4 to calculate the slope cumulative value for a fourth section 712. The controller may also calculate '+2.3 hpa/ms', which is the slope value between the pressure sample value at t4 and the pressure sample value at t5. Thus, the slope cumulative value of the fourth section 712 becomes '+4.2 hpa/ms'.

The controller may determine the third section 711 having '+2.3 hpa/ms' as the slope cumulative value as the 'pressure maintaining state' and the fourth section 712 having '+4.2 hpa/ms' as the slope cumulative value as the 'pressure rising state'.

The controller may control the operation of the first heater based on states of the sections adjacent to each other. If the third section 711 is determined as the 'pressure maintaining state' and the fourth section 712 following the third section 711 is determined as the 'pressure rising state' based on a result of monitoring a signal from the puff sensor, it may indicate a situation in which pressure within an aerosol generating device increases again because air flows into the aerosol generating device from outside as puffing ends. The controller may confirm the end of puffing and suspend the operation of the first heater.

Referring to FIG. 7A, as the third section 711 is determined as the 'pressure maintaining state' and the fourth section 712 is determined as the 'pressure rising state', the controller may suspend the operation of the first heater at t7 at which a certain period of time has further passed from the end point of the fourth section 712. Alternatively, a time point at which the operation of the first heater is suspended may be t5, which is the end point of the fourth section 712.

Based on the signal received from the puff sensor, if the first section 611 illustrated in FIG. 6 is determined as the 'pressure maintaining state', the second section 612 illustrated in FIG. 6 is determined as the 'pressure falling state', the third section 711 illustrated in FIG. 7A is determined as the 'pressure maintaining state', and the fourth section 712 illustrated in FIG. 7A is determined as the 'pressure rising state', the controller may determine that a puff pattern corresponds to normal puffing and may count the number of puffs following the end of the fourth section 712.

Compared to FIG. 7A, in FIG. 7B, when the third section 711 is determined as the 'pressure maintaining state', the fourth section 712 following the third section 711 is determined as the 'pressure rising state', and in addition to which, a fifth section 713 following the fourth section 712 is determined as the 'pressure maintaining state', the controller may suspend the operation of the first heater.

As described above in FIG. 7A, since the slope cumulative value of the fourth section 712 is '+4.2 hpa/ms', the fourth section 712 may be determined as the 'pressure rising state'.

The controller may monitor whether the 'pressure rising state' is maintained or not following the fourth section 712. Referring to FIG. 7B, the slope cumulative values for three pressure sample values adjacent to each other from t5 to t9 are '+7.2 hpa/ms(=3.7+3.5)' and '+4.0 hpa/ms(=3.3+0.7)', which are greater than or equal to +4 hpa/ms. On the other hand, the slope cumulative value from t9 to t11 is '0.1 hpa/ms (=0.1+0.0)', which is less than +4 hpa/ms. The controller may determine that the 'pressure rising state' is maintained until t9, following the fourth section 712.

After the 'pressure rising state' of the fourth section 712 and the 'pressure rising state' following the fourth section 712 end, the controller may determine whether the state of the fifth section 713 corresponds to the 'pressure maintaining state' or not.

To obtain the slope cumulative value for the fifth section 713, the controller may calculate '+0.1 hpa/ms', which is the slope value between the pressure sample value at t9 and the pressure sample value at t10. The controller may also calculate '+0.0 hpa/ms', which is the slope value between the pressure sample value at t10 and the pressure sample value at t11. Thus, since the slope cumulative value of the fifth section 713 is '+0.1 hpa/ms', which is less than +4 hpa/ms, the controller may determine the fifth section 713 as the 'pressure maintaining state'.

The controller may control the operation of the first heater based on the states of the sections adjacent to each other. Based on a result of monitoring the signal received from the puff sensor, if the third section 711 is determined as the 'pressure maintaining state', the fourth section 712 following the third section 711 is determined as the 'pressure rising state', and the fifth section 713 following the fourth section 712 is determined as the 'pressure maintaining state', it may indicate a situation in which pressure within the aerosol generating device increases and then becomes constant because air flows into the aerosol generating device from outside as puffing ends. The controller may confirm the end of puffing and may suspend the operation of the first heater.

Referring to FIG. 7B, the controller may suspend the operation of the first heater at t12, at which a certain period of time has further passed from the end point of the fifth section 713. Alternatively, the time point at which the operation of the first heater is suspended may be t11, which is the end point of the fifth section 713.

When the first section 611 illustrated in FIG. 6 is determined as the 'pressure maintaining state', the second section 612 illustrated in FIG. 6 is determined as the 'pressure falling state', the third section 711 illustrated in FIG. 7B is determined as the 'pressure maintaining state', the fourth section 712 illustrated in FIG. 7B is determined as the 'pressure rising state', and the fifth section 713 illustrated in FIG. 7B is determined as the 'pressure maintaining state', the controller may determine the puff pattern as the normal puffing and may count the number of puffs.

If the puff pattern 700 of FIG. 7B is detected a fourteenth time in a puff series having fourteen times of puffs, it may indicate a situation in which the puff series is completed. Thus, the controller may suspend the operation of a second heater as well as the first heater.

In an embodiment, when the puff pattern 600 of FIG. 6 is detected for the first time, the controller may start the operation of the first and second heaters, and when the puff series is completed later, the controller may suspend the operation of the first and second heaters.

In another embodiment, the second heater may have entered the preheating mode even before the puff pattern 600 of FIG. 6 is detected for the first time. When the puff pattern 600 is detected for the first time, the controller may start the operation of the first heater, and since the second heater is already in the preheating mode, the controller may switch the second heater from the preheating mode to the heating mode. Following that, when the puff series is completed, the controller may suspend the operation of the first and second heaters.

Figure 8:
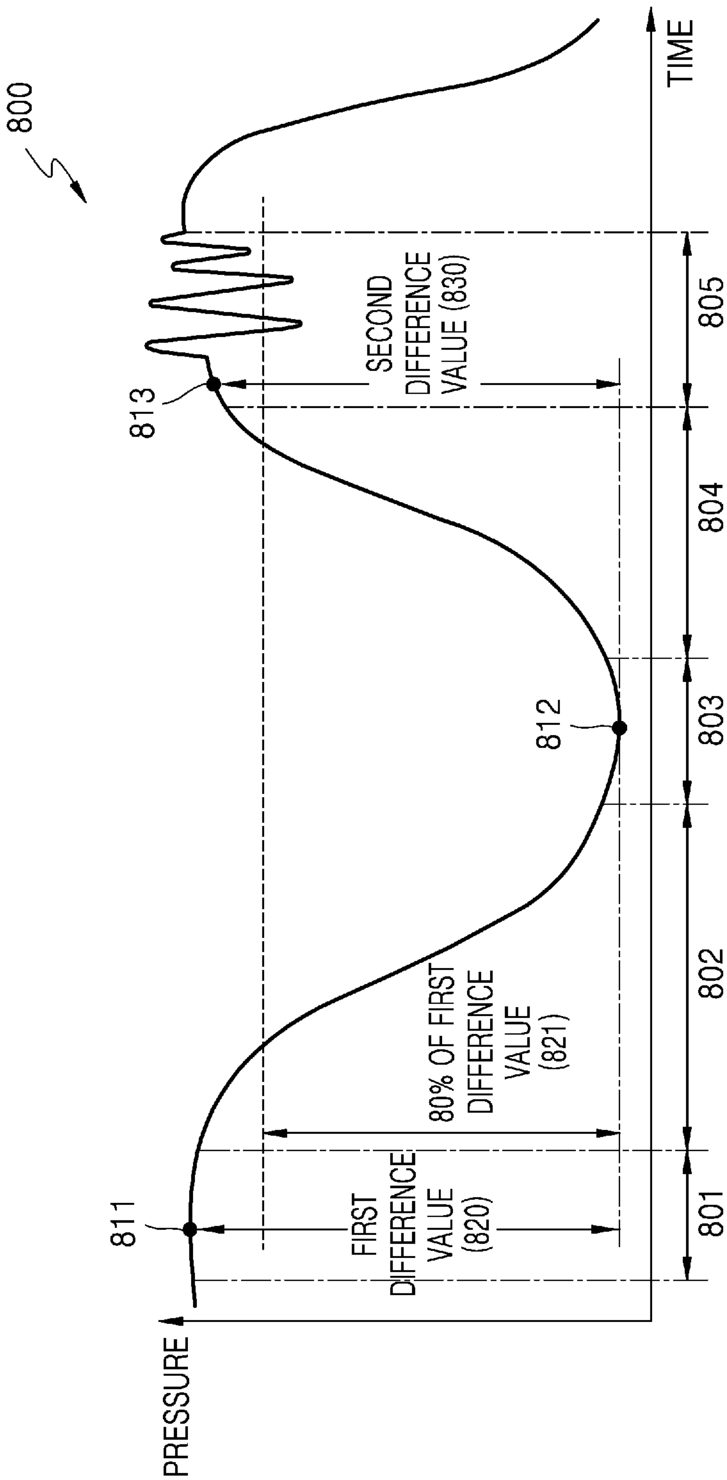
FIG. 8 is a diagram illustrating an example of a puff pattern including a pressure fluctuation state according to an embodiment of the present disclosure.

FIG. 8 is a diagram illustrating an example of a puff pattern including a pressure fluctuation state according to an embodiment of the present disclosure.

Referring to FIG. 8, a puff pattern 800 may include a pressure maintaining state 801 and 803, a pressure falling state 802, and a pressure rising state 804. The puff pattern 800 may also include a pressure fluctuation state 805.

Based on a signal from a puff sensor, if a state has changed in the order of the pressure maintaining state 801 and the pressure falling state 802, the controller may start an operation of at least one of a first and second heater.

According to the foregoing embodiments, after at least one of the first and second heater has started operation, if the state changes in the order of the pressure maintaining state 803, the pressure rising state 804, and a pressure maintaining state, based on a result of monitoring the signal received from the puff sensor, the controller may suspend the operation of at least one of the first and second heaters. When the state has changed in the order of the pressure maintaining state 801, the pressure falling state 802, the pressure maintaining state 803, the pressure rising state 804, and a pressure maintaining state, the controller may determine a puff pattern as normal puffing and may count the number of puffs.

As illustrated in FIG. 8, the pressure fluctuation state 805 may occur following the pressure rising state 804. Pressure may be irregular in the pressure fluctuation state 805 due to the external environment. When the pressure fluctuation state 805 occurs, the controller may determine whether to suspend the operation of the first heater and whether to count the number of puffs, based on a difference value between pressure sample values.

Referring to FIG. 6, a first pressure sample value 811 may be one of the pressure sample values included in the first section 611. In addition, referring to FIG. 7B, a second pressure sample value 812 may be one of the pressure sample values included in the third section 711, and a third pressure sample value 813 may be one of the pressure sample values included in the fifth section 713.

The controller may calculate a first difference value 820 between the first pressure sample value 811 and the second pressure sample value 812, and may calculate a second difference value 830 between the second pressure sample value 812 and the third pressure sample value 813.

In addition, the controller may determine whether the second difference value 830 is greater than a certain percentage of the first difference value 820. For example, the controller may determine whether the second difference value 830 is greater than 80% of the first difference value 821.

When the second difference value 830 is greater than 80% of the first difference value 821, even if the pressure fluctuation state 805, not a pressure maintaining state, has occurred following the pressure rising state 804, the controller may suspend the operation of at least one of the first and second heater and count the number of puffs.

When a puff sensor detects pressure within an aerosol generating device, an irregular pressure fluctuation due to the external environment may be detected. According to one or more embodiments of the present disclosure, even when a pressure fluctuation state is included in the puff pattern, the aerosol generating device may be controlled by taking a difference value between the pressure sample values into consideration.

Figure 9:
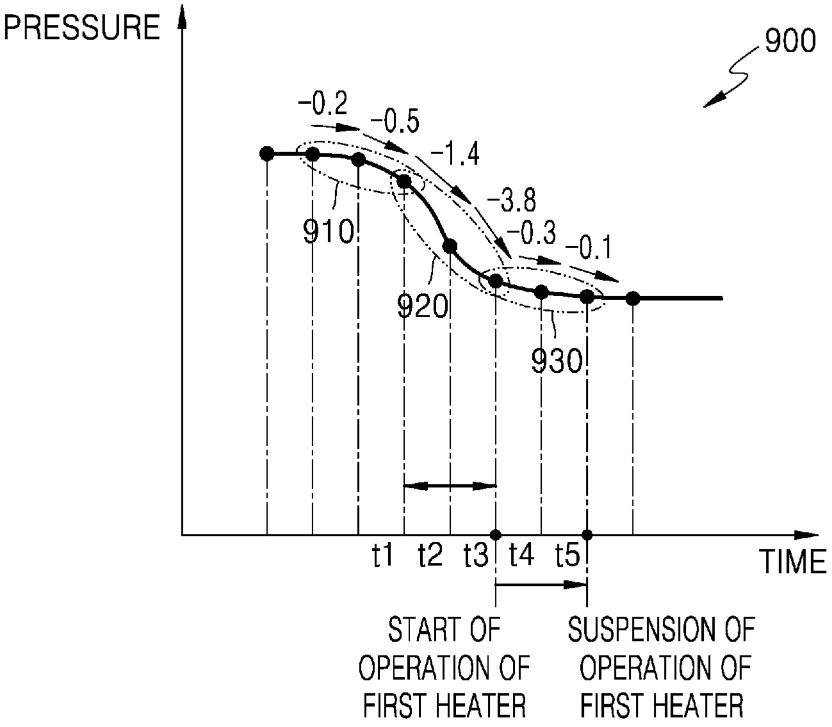
FIG. 9 is a diagram illustrating an example of detecting a puff error according to an embodiment of the present disclosure.

FIG. 9 is a diagram illustrating an example of detecting a puff error according to an embodiment of the present disclosure.

Referring to FIG. 9, of a plurality of pressure sample values included in a puff pattern 900, a certain number of consecutive pressure sample values may form a section. For example, three consecutive pressure sample values may be included in the section.

In an embodiment, a controller may determine a state of a particular section in which a slope cumulative value is maintained within a preset range as a 'pressure maintaining state' and the state of a particular section in which the slope cumulative value is less than a preset negative value as a 'pressure falling state.' For example, the controller may determine the state of a particular section in which the slope cumulative value is maintained at −4 hpa/ms or greater and less than +4 hpa/ms as the 'pressure maintaining state' and the state of a particular section in which the slope cumulative value is maintained below −4 hpa/ms as the 'pressure falling state'.

Referring to FIG. 9, since the slope cumulative value of a first section 910 is '−0.7 hpa/ms', the first section 910 may be determined as the 'pressure maintaining state', and since the slope cumulative value of a second section 920 is '−5.2 hpa/ms', the second section 920 may be determined as the 'pressure falling state'.

The fact that the first section 910 is determined as the 'pressure maintaining state' and the second section 920 following the first section 910 is determined as the 'pressure falling state' may refer to a situation in which pressure within an aerosol generating device is reduced as air within the aerosol generating device flows outward after puffing started. The controller may confirm the start of puffing and start an operation of a first heater from t3.

In addition, the controller may start the operation of the first heater and determine a duration of the 'pressure falling state' following the second section 920. The controller may control the operation of the first heater based on whether the duration of the 'pressure falling state' following the second section 920 is within a preset range of time.

In an embodiment, since the case where the duration of the 'pressure falling state' following the second section 920 is within the preset range of time corresponds to normal puffing, the controller may continue the operation of the first heater. However, if the duration of the 'pressure falling state' following the second section 920 is less than or greater than the preset range of time, the controller may determine that there is a puff detection error and suspend the operation of the first heater.

The preset range of time may be set based on how long a user inhales air during one puff, and the preset range of time may be set within 400 ms to 520 ms. However, embodiments of the present disclosure are not limited thereto.

For example, when a time interval between the pressure sample values is 40 ms, if the 'pressure falling state' ends before ten pressure sample values are calculated (that is, before 400 ms) following the second section 920, or if the 'pressure falling state continues even after thirteen pressure sample values are calculated (that is, after 520 ms), the controller may determine such cases as puff detection errors and thus suspend the operation of the first heater.

Referring to FIG. 9, although the first section 910 has been determined as the 'pressure maintaining state', and the second section 920 has been determined as the 'pressure falling state', the slope cumulative vale of a third section 930 has become '−0.4 hpa/ms'. Thus, the third section 930 may be determined as the 'pressure maintaining state'. Since the duration of the 'pressure falling state' following the second section 920 is less than the preset range of time (400 ms to 520 ms), the controller may determine the puff pattern 900 as abnormality at t5, thus immediately suspend the operation of the first heater.

Apart from the example illustrated in FIG. 9, when a puff pattern does not correspond to normal puffing after the operation of a heating element is started, the controller may determine such case as a puff recognition error and thus suspend the operation of the heating element. For example, referring to FIG. 4, if the state changes in the order of the pressure maintaining state 410, the pressure falling state 420, the pressure maintaining state 430, and the pressure rising state 440, and the duration of the pressure rising state 440 is less than or greater than the preset range of time, the controller may determine the case as a puff detection error and thus suspend the operation of the heating element.

The controller may limit an operation time for the first heater to operates one time to less than or equal to an allowable operation time. The first heater heats a liquid composition absorbed by a liquid delivery element such as a wick. In such case, since the amount of the liquid composition absorbed by the liquid delivery element is limited, if the first heater is operated beyond the allowable operation time, sufficient aerosol may not be generated and the liquid delivery element may be carbonized. The allowable operation time of the first heater may be two seconds (2000 ms). However, embodiments of the present disclosure are not limited thereto.

In the puff detection error situation as shown in FIG. 9, the controller may measure the time taken from the start of the operation of the first heater until the suspension thereof. The controller may reduce the allowable operation time of the first heater for the next time, in proportion to the time for which the first heater has operated in the puff detection error situation. Without considering the time for which the first heater has operated in the previous puff detection error situation, if the first heater is heated for the allowable operation time, as described above, sufficient aerosol may not be generated and the liquid delivery element may be carbonized.

For example, when the time for which the first heater has operated in the puff detection error situation is 200 ms, the controller may set the allowable operation time at 1800 ms (2000−200=1800 ms) when the first heater operates the next time.

Figure 10:
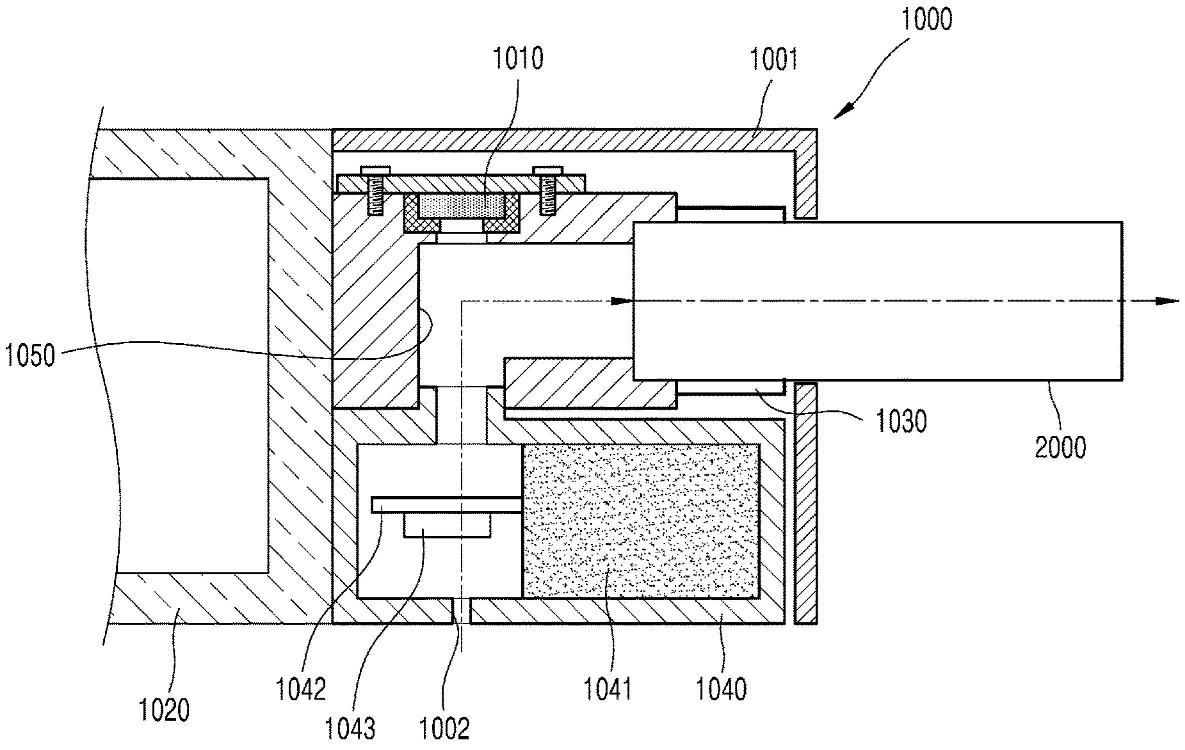
FIG. 10 is a diagram illustrating an example of an aerosol generating device according to an embodiment of the present disclosure.

FIG. 10 is a diagram illustrating an example of an aerosol generating device according to an embodiment of the present disclosure.

Referring to FIG. 10, an aerosol generating device 1000 includes a case 1001 for forming an exterior. The case 1001 is provided with an insertion portion 1003 into which the cigarette 2000 is inserted.

The aerosol generating device 1000 may include a pressure detection sensor 1010 for detecting a change in the pressure of air inhaled through the cigarette 2000. The pressure detection sensor 1010 may detect inhalation pressure, which is air pressure generated by an inhalation action (puffing) by a user biting the cigarette 2000, to generate a signal.

A detection signal from the pressure detection sensor 1010 is transmitted to a controller 1020. By using the pressure detection sensor 1010, the controller 1020 may control the aerosol generating device 1000 to automatically end an operation of a vaporizer 1040 and a second heater 1030 following a preset number (for example, fourteen times) of puffing.

In addition, the controller 1020 may forcibly end the operation of the vaporizer 1040 and of the second heater 1030 after a preset time (for example, six minutes) has passed even when the number of puffing does not reach the preset number (for example, fourteen times).

Within the aerosol generating device 1000, the aerosol generated by the vaporizer 1040 is delivered to a user through the cigarette 2000. The vaporizer 1040 and the cigarette 2000 are connected to each other by a mainstream passage 1050.

The mainstream passage 1050 connects the cigarette 2000 to the outside such that air from outside may flow into the cigarette 2000 by the user biting the cigarette 2000 and inhaling (puffing). The air from outside is inhaled within the case 1001 through an air vent 1002 arranged in the case 1001. Air passes through the vaporizer 1040. The air passing through the vaporizer 1040 includes aerosol generated by atomizing a liquid. The air passing through the vaporizer 1040 is drawn into the cigarette 2000 through the mainstream passage 1050. The air drawn into the cigarette 2000 passes through a tobacco rod and a filter rod to be inhaled by the user.

The vaporizer 1040 may include a liquid storage 1041, a liquid delivery element 1042, and a first heater 1043 for heating a liquid. The liquid storage 1041 may be in the form of an individually replaceable cartridge. Alternatively, the liquid storage 1041 may have a structure in which liquid is able to be replenished. The vaporizer 1040 may be in the form of a completely replaceable cartridge.

The liquid delivery element 1042 may absorb a liquid composition accommodated in the liquid storage 1041, and the first heater 1043 may heat the liquid composition absorbed by the liquid delivery element 1042 to generate aerosol.

In an embodiment, when the first heater 1043 operates for about two seconds, the liquid composition absorbed by the liquid delivery element 1042 may be completely vaporized as aerosol. When the first heater 1043 is heated for two seconds or longer, sufficient aerosol may not be generated after two seconds, and the liquid delivery element 1042 may be carbonized.

The first heater 1043 may start or continue its operation based on a puff pattern, and a controller may measure an operation time of the first heater 1043 in operation based on the puff pattern. When the operation time of the first heater 1043 exceeds an allowable operation time, the controller may suspend the operation of the first heater 1043. The allowable operation time of the first heater 1043 may be two seconds. However, embodiments of the present disclosure are not limited thereto.

Figure 11:
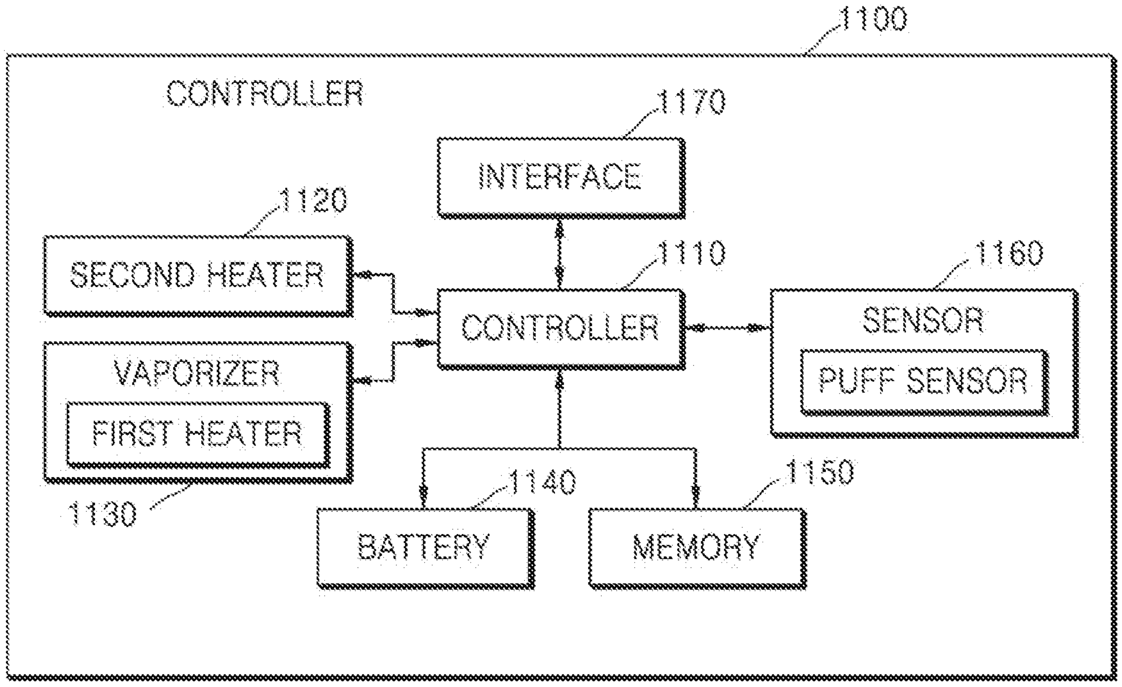
FIG. 11 is a block diagram illustrating a hardware configuration of an aerosol generating device according to an embodiment of the present disclosure.

FIG. 11 is a block diagram illustrating a hardware configuration of an aerosol generating device according to an embodiment of the present disclosure.

Referring to FIG. 11, an aerosol generating device 1100 may include a controller 1110, a second heater 1120, a vaporizer 1130, a battery 1140, a memory 1150, a sensor 1160, and an interface 1170.

The second heater 1120 is electrically heated by electrical power supplied by the battery 1140, under the control of the controller 1110. The second heater 1120 is arranged in an accommodation passage of the aerosol generating device 1100 accommodating a cigarette. An end portion of one side of the cigarette may be inserted into the second heater 1120 as the cigarette is inserted into the aerosol generating device

1100 from outside through an insertion hole and then is moved along the accommodation passage. Heated second heater 1120 may raise temperature of an aerosol generating material in the cigarette. The second heater 1120 may be in any form capable of being inserted into the cigarette.

The second heater 1120 may include an electric resistive heater. For example, the second heater 1120 may include an electrically conductive track, and as electric current flows through the electrically conductive track, the second heater 1120 may be heated.

For stable use, the second heater 1120 may be supplied with electric power according to specifications of 3.2 V, 2.4 A, and 8 W. However, embodiments of the present disclosure are not limited thereto. For example, when electric power is supplied to the second heater 1120, temperature of a surface of the second heater 1120 may rise to 400° C. or higher. Within fifteen seconds after electric power is supplied to the second heater 1120, the temperature of a surface of the second heater 1120 may rise to about 350° C.

A separate temperature detection sensor may be included within the aerosol generating device 1100. Alternatively, instead of including a separate temperature detection sensor within the aerosol generating device 1100, the second heater 1120 may function as a temperature detection sensor. Alternatively, while the second heater 1120 functions as a temperature detection sensor, a separate temperature detection sensor may be further included within the aerosol generating device 1100. For the second heater 1120 to function as a temperature detection sensor, the second heater 1120 may include at least one electrically conductive track for heat generation and temperature detection. The second heater 1120 may also include a separate second electrically conductive track for the temperature detection apart from a first electrically conductive track for the heat generation.

Once voltage across the second electrically conductive track and current flowing through the second electrically conductive track are measured, resistance R may be determined. In that case, a temperature T of the second electrically conductive track may be determined by Equation 1 below.

$$R=R_0\{1+\alpha(T-T_0)\} \quad \text{[Equation 1]}$$

In Equation 1, R refers to a current resistance value of the second electrically conductive track, R0 refers to a resistance value at the temperature T0 (for example, 0° C.), and α refers to a resistance temperature coefficient of the second electrically conductive track. Since a conductive material (for example, metal) has an intrinsic resistance temperature coefficient, α may be predetermined depending on the conductive material constituting the second electrically conductive track. Thus, when the resistance R of the second electrically conductive track is determined, the temperature T of the second electrically conductive track may be calculated by Equation 1 above.

The second heater 1120 may include at least one electrically conductive track (the first electrically conductive track and the second electrically conductive track). For example, the second heater 1120 may include two first electrically conductive track and one or two second electrically conductive track. However, embodiments of the present disclosure are not limited thereto.

An electrically conductive track includes an electrically resistive material. As an example, the electrically conductive track may be made of a metallic material. As another example, the electrically conductive track may be made of an electrically conductive ceramic material, carbon, a metallic alloy or a composite material of a ceramic material and metal.

The vaporizer 1130 may include a liquid storage, a liquid delivery element and a first heater for heating a liquid.

The liquid storage may store a liquid composition. For example, the liquid composition may include a liquid containing a tobacco-containing substance containing a volatile tobacco flavor component or a liquid containing a non-tobacco substance. The liquid storage may be manufactured to be able to be detachably attached to the vaporizer 1130 and may be manufactured to be integral with the vaporizer 1130.

The liquid composition may include water, solvents, ethanol, plant extracts, spices, flavorings, or vitamin mixtures. The spices may include menthol, peppermint, spearmint oil, various fruit-flavored ingredients, and the like. However, embodiments of the present disclosure are not limited thereto. The flavorings may include ingredients that may provide a user with a variety of flavors or tastes. The vitamin mixtures may include a mixture of at least one of vitamin A, vitamin B, vitamin C, and vitamin E. However, embodiments of the present disclosure are not limited thereto. The liquid composition may also include an aerosol forming agent, such as glycerin and propylene glycol.

The liquid delivery element may deliver the liquid composition of the liquid storage to the first heater. For example, the liquid delivery element may include a wick, such as cotton fibers, ceramic fibers, glass fibers, or porous ceramic. However, embodiments of the present disclosure are not limited thereto.

The first heater is an element for heating the liquid composition delivered by the liquid delivery element. For example, the first heater may include a metal heating wire, a metal hot plate, a ceramic heater, and the like. However, embodiments of the present disclosure are not limited thereto. The first heater may also include a conductive filament, such as a nichrome wire and may be arranged in a structure wound around the liquid delivery element. In addition, the first heater may be heated by electric power supply and may deliver heat to the liquid composition in contact with the first heater to heat the liquid composition. As a result, aerosol may be generated.

The vaporizer 1130 may be referred to as a cartomizer or an atomizer. However, embodiments of the present disclosure are not limited thereto.

The controller 1110 is hardware for controlling the overall operation of the aerosol generating device 1100. The controller 1110 may include an integrated circuit implemented with a processing unit, such as a microprocessor, a microcontroller, and the like.

The controller 1110 analyzes a result sensed by the sensor 1160 and controls processes to be executed subsequently. The controller 1110 may start or suspend power supply to the second heater 1120 from the battery 1140 according to the sensed result. In addition, the controller 1110 may control the amount of the power supplied to the second heater 1120 and the time at which the power is supplied for the second heater 1120 to be heated to a certain temperature or to be able to maintain a suitable temperature. Moreover, the controller 1110 may process a variety of input data and output data of the interface 1170.

Furthermore, the controller 1110 counts a frequency of smoking of the user using the aerosol generating device 1100 and may control related functions of the aerosol generating device 1100 to limit the user's smoking according to the counted result.

The memory 1150 is hardware for storing a variety of data being processed within the aerosol generating device 1100 and may store data processed and also data to be processed in the controller 1110. The memory 1150 may be implemented with various types of memory, such as random access memory (RAM), such as dynamic random access memory (DRAM), static random access memory (SRAM), and the like and read-only memory (ROM), electrically erasable programmable read-only memory (EEPROM), and the like.

The memory 1150 may store data on the user's smoking pattern, such as smoking time, the frequency of smoking, and the like. The memory 1150 may also store data related to a reference temperature change value of the case where the cigarette is accommodated in the accommodation passage.

The battery 1140 supplies electric power used to operate the aerosol generating device 1100. In other words, the battery 1140 may supply electric power for the second heater 1120 to be heated. The battery 1140 may also supply electric power required to operate other hardware, the controller 1110, the sensor 1160, and the interface 1170 provided within the aerosol generating device 1100. The battery 1140 may include a lithium iron phosphate ($LiFePO4$) battery. However, embodiments of the present disclosure are not limited thereto. The battery 1140 may be made of a lithium cobalt oxide ($LiCoO2$) battery, a lithium titanate battery, and the like. The battery 1140 may include a rechargeable battery or a disposable battery.

The sensor 1160 may include various types of sensors, such as a puff detection sensor (a temperature detection sensor, a flow detection sensor, a position detection sensor, and the like), a cigarette insertion detection sensor, a temperature detection sensor of a heater, and the like. A result sensed by the sensor 1160 is transmitted to the controller 1110, and the controller 1110 may control the aerosol generating device 1100 to execute a variety of functions, such as control of a heater temperature, restriction of smoking, determination of whether or not the cigarette is inserted, notification display, and the like according to the sensed result.

The interface 1170 may include a variety of interfacing means, such as a display or lamp for outputting visual information, a motor for outputting tactile information, a speaker for outputting sound information, terminals for communicating data with input/output (I/O) interfacing means (for example, a button or a touchscreen) receiving input information from a user or outputting information to the user or for receiving charged electric power, a communication interfacing module for communicating wirelessly with an external device (for example, Wi-Fi, Wi-Fi direct, Bluetooth, near-field communication (NFC), and the like), and the like. However, the aerosol generating device 1100 may be implemented by selecting only some of the various interfacing means described above.

Figure 12:
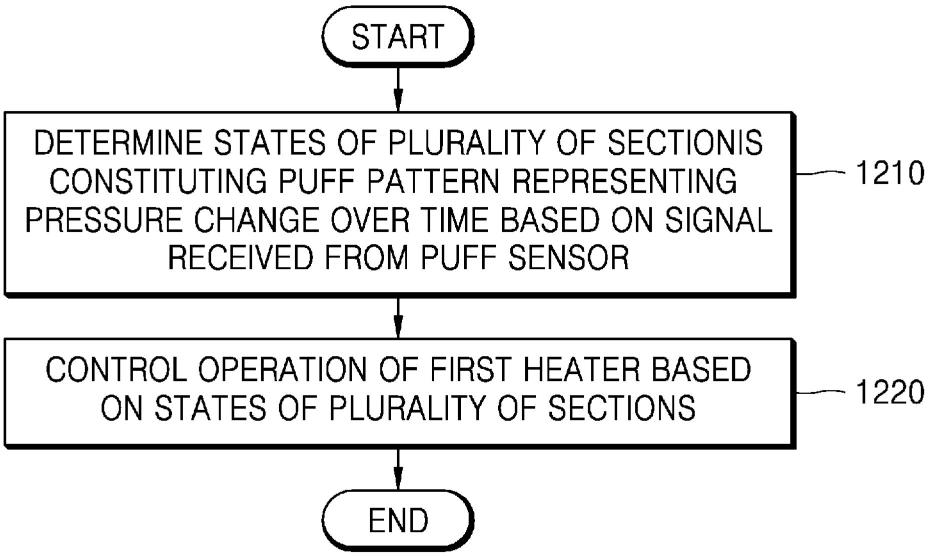
FIG. 12 is a flowchart of a method of controlling an aerosol generating device according to an embodiment of the present disclosure.

FIG. 12 is a flowchart of a method of controlling an aerosol generating device according to an embodiment of the present disclosure.

Referring to FIG. 12, in operation 1210, the aerosol generating device may determine states of a plurality of sections constituting a puff pattern representing a pressure change over time, based on a signal received from a puff sensor.

In an embodiment, the aerosol generating device may calculate a slope cumulative value for each of the plurality of sections constituting the puff pattern and may determine states of the plurality of sections, based on the slope cumulative value of each of the plurality of sections.

Pressure measured values measured at certain intervals of time may be included in the signal received from the puff sensor, and the aerosol generating device may calculate the slope cumulative value, using the pressure measured values. For example, the aerosol generating device averages consecutive values of some of the pressure measured values to calculate a plurality of pressure sample values and may calculate the slope cumulative value from consecutive plurality of pressure sample values.

In operation 1220, the aerosol generating device may control an operation of a first heater, based on the states of the plurality of sections.

In an embodiment, a first section and a second section following the first section may be included in the plurality of sections. The aerosol generating device may determine states of the first section and the second section, based on the slope cumulative value of the first section and the slope cumulative value of the second section. When the first section is determined as a pressure maintaining state and the second section is determined as a pressure falling state, the aerosol generating device may start the operation of the first heater.

The plurality of sections may include a third section following the second section and a fourth section following the third section. The aerosol generating device may determine states of the third section and the fourth section, based on the slope cumulative value of the third section and the slope cumulative value of the fourth section. When the third section is determined as the pressure maintaining state and the fourth section is determined as a pressure rising section, the aerosol generating device may suspend the operation of the first heater.

In addition, The plurality of sections may further include a fifth section following the fourth section. The aerosol generating device may determine state of the fifth section, based on the slope cumulative value of the fifth section. When the fifth section is determined as the pressure maintaining state, the aerosol generating device may suspend the operation of the first heater.

In an embodiment, the aerosol generating device may calculate a first difference value between the pressure sample value of the first section and the pressure sample value of the third section, and may calculate a second difference value between the pressure sample value of the third section and the pressure sample value of the fifth section. When the second difference value is greater than a certain percentage of the first difference value, the aerosol generating device may suspend the operation of the first heater.

In an embodiment, when the slope cumulative value of a particular section is within a preset range, the particular section may be determined as the pressure maintaining state, and when the slope cumulative value of the particular section is equal to or less than a preset negative value, the particular section may be determined as the pressure falling state. When the slope cumulative value of the particular section is equal to or greater than a preset positive value, the particular section may be determined as the pressure rising state.

Those of ordinary skill in the art related to the present embodiments may understand that various changes in form and details can be made therein without departing from the scope of the characteristics described above. The disclosed methods should be considered in a descriptive sense only and not for purposes of limitation. Therefore, the scope of the disclosure should be defined by the appended claims, and all differences within the scope equivalent to those described in the claims will be construed as being included in the scope of protection defined by the claims.

What is claimed is:

1. An aerosol generating device comprising:
a heater configured to heat an aerosol generating material in a cigarette;
a puff sensor configured to detect a pressure change in the aerosol generating device; and
a controller configured to:
determine states of a plurality of sections constituting a puff pattern representing a pressure change over time, based on a signal received from the puff sensor, and
control an operation of the heater, based on the states of the plurality of sections,
wherein the plurality of sections include a first section, a second section following the first section, a third section following the second section, a fourth section following the third section, and a fifth section following the fourth section, and
wherein the controller is further configured to count a number of puffs based on the first section being determined as a pressure maintaining state, the second section being determined as a pressure falling state, the third section being determined as a pressure maintaining state, the fourth section being determined as a pressure rising state, and the fifth section being determined as a pressure maintaining state.

2. The aerosol generating device of claim 1, wherein the controller is further configured to start the operation of the heater when the first section is determined as the pressure maintaining state and the second section is determined as the pressure falling state.

3. The aerosol generating device of claim 1, wherein the controller is further configured to suspend the operation of the heater when the third section is determined as the pressure maintaining state and the fourth section is determined as the pressure rising state.

4. The aerosol generating device of claim 1, wherein the controller is further configured to suspend the operation of the first heater when the third section is determined as the pressure maintaining state, the fourth section is determined as the pressure rising state, and the fifth section is determined as the pressure maintaining state.

5. The aerosol generating device of claim 1, wherein each of the plurality of sections includes at least a pressure sample value, and
the controller is further configured to
calculate a first difference value between a pressure sample value of the first section and a pressure sample value of the third section and a second difference value between a pressure sample value of the third section and a pressure sample value of the fifth section, and
suspend the operation of the heater when the second difference value is greater than a predetermined percentage of the first difference value.

6. The aerosol generating device of claim 1, wherein the controller is further configured to
calculate a slope cumulative value for each of the plurality of sections, and
determine states of the plurality of sections, based on the slope cumulative value of each of the plurality of sections.

7. The aerosol generating device of claim 6, wherein,
when the slope cumulative value of a certain section is within a preset range, the certain section is determined as the pressure maintaining state,
when the slope cumulative value of a certain section is less than or equal to a preset negative value, the certain section is determined as the pressure falling state, and
when the slope cumulative value of a certain section is greater than or equal to a preset positive value, the certain section is determined as the pressure rising state.

8. The aerosol generating device of claim 6, wherein the signal received from the puff sensor includes pressure measured values measured at predetermined intervals of time, and
the controller is further configured to average consecutive values of some of the pressure measured values to calculate a plurality of pressure sample values and calculate the slope cumulative value from the consecutive plurality of pressure sample values.

9. The aerosol generating device of claim 2, wherein the controller is further configured to
start the operation of the heater to determine whether the pressure falling state following the second section continues for a preset period of time or not, and
determine the case where the pressure falling state following the second section continues for the preset period of time or less as a puff detection error and suspend the operation of the heater.

10. The aerosol generating device of claim 9, wherein an operation time in which the heater operates one time is limited to an allowable operation time or less, and
the controller is further configured to
measure a time taken from the start of the operation of the first heater until the suspension of the operation of the heater in the case of the puff detection error, and
reduce the allowable operation time in proportion to the taken time when the heater operates the next time.

11. A method of controlling an aerosol generating device, the method comprising:
determining states of a plurality of sections constituting a puff pattern representing a pressure change over time, based on a signal received from a puff sensor in the aerosol generating device; and
controlling an operation of a heater in the aerosol generating device and a count for a number of puffs, based on the states of the plurality of sections,
wherein the plurality of sections include a first section, a second section following the first section, a third section following the second section, a fourth section following the third section, and a fifth section following the fourth section, and
wherein the controlling of the count for the number of the puffs comprises counting a number of puffs based on the first section being determined as a pressure maintaining state, the second section being determined as a pressure falling state, the third section being determined as a pressure maintaining state, the fourth section being determined as a pressure rising state, and the fifth section being determined as a pressure maintaining state.

12. The method of claim 11, wherein the controlling of the operation of the heater comprises starting the operation of the heater when the first section is determined as the pressure maintaining state and the second section is determined as the pressure falling state.

13. The method of claim 11, wherein the controlling of the operation of the heater comprises suspending the operation of the heater when the third section is determined as the pressure maintaining state and the fourth section is determined as the pressure rising state.

14. The method of claim 11, wherein the controlling of the operation of the heater comprises suspending the operation of the heater when the third section is determined as the pressure maintaining state, the fourth section is determined as the pressure rising state, and the fifth section is determined as the pressure maintaining state.

15. The method of claim 11, wherein the determining of the state of each of the plurality of sections comprises
calculating a slope cumulative value for each of the plurality of sections, and
determining states of the plurality of sections, based on the slope cumulative value of each of the plurality of sections.

16. The method of claim 15, wherein the determining of the state of each of the plurality of sections further comprises:
when the slope cumulative value of a certain section is within a preset range, determining the certain section as the pressure maintaining state,
when the slope cumulative value of a certain section is less than or equal to a preset negative value, determining the certain section as the pressure falling state, and
when the slope cumulative value of a certain section is greater than or equal to a preset positive value, determining the certain section as the pressure rising state.

17. The method of claim 15, wherein pressure measured values measured at predetermined intervals of time are included in the signal received from the puff sensor, and
wherein the calculating of the slope cumulative value comprises
averaging consecutive values of some of the pressure measured values to calculate a plurality of pressure sample values; and
calculating the slope cumulative value for each of the plurality of sections from the consecutive plurality of pressure sample values.

18. The method of claim 12, wherein the method further comprises
determining whether the pressure falling state following the second section continues for a preset period of time or not after the heater starts operating, and
determining the case where the pressure falling state following the second section continues for the preset period of time or less as a puff detection error and suspending the operation of the heater.

19. A non-transitory computer readable recording medium having recorded thereon a computer program for executing the method of claim 11.

* * * * *